(12) United States Patent
Jeong et al.

(10) Patent No.: US 7,957,739 B2
(45) Date of Patent: Jun. 7, 2011

(54) METHOD AND APPARATUS FOR TRANSMITTING/RECEIVING NETWORK SHARING INFORMATION ABOUT NEIGHBOR CELLS IN A NETWORK SHARING SYSTEM

(75) Inventors: Kyeong-In Jeong, Suwon-si (KR); Gert Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 941 days.

(21) Appl. No.: 11/340,861

(22) Filed: Jan. 27, 2006

(65) Prior Publication Data

US 2006/0166694 A1  Jul. 27, 2006

(30) Foreign Application Priority Data

Jan. 27, 2005  (KR) .................. 10-2005-0007785

(51) Int. Cl.
*H04W 36/00* (2009.01)
(52) U.S. Cl. ........................................ 455/436; 455/435
(58) Field of Classification Search .................. 455/525, 455/432.1, 150.1, 435.2, 436–452.1; 370/331, 370/332

See application file for complete search history.

(56) References Cited

U.S. PATENT DOCUMENTS

| 7,072,656 | B2 * | 7/2006 | Willars et al. ................. 455/436 |
| 7,257,421 | B2 * | 8/2007 | Vasudevan et al. ............ 455/525 |
| 2003/0013443 | A1 * | 1/2003 | Willars et al. ................. 455/432 |
| 2004/0105429 | A1 | 6/2004 | Anckar et al. |
| 2004/0203775 | A1 * | 10/2004 | Bourdeaut et al. ......... 455/435.1 |
| 2004/0242260 | A1 * | 12/2004 | Lescuyer ....................... 455/525 |
| 2005/0215253 | A1 * | 9/2005 | Johannesson et al. ..... 455/435.2 |
| 2006/0114870 | A1 * | 6/2006 | Buckley et al. ............... 370/338 |

FOREIGN PATENT DOCUMENTS

| EP | 1353521 A1 * | 10/2002 |
| EP | 1 353 521 A1 | 10/2003 |
| KR | 10-2003-0084968 A | 11/2003 |

OTHER PUBLICATIONS

TSG-RAN Meeting #26, TSG-RAN WG2, "Network Sharing and Multiple PLMN Identities"; CR 2487 to 25.331; Dec. 8-10, 2004, pp. 1-56, XP002378283, Athens, Greece, http:/www.3gpp.org/ftp/tsg_ran/TSG_RAN/TSGR_26/Docs/PDF/RP-040495.pdf.
TSG #22(04) 0229, "CR to 22.011 on Multimode Terminals with 3GPP Capability (Rel-7)", TSG Services and System Aspects, Jun. 7-10, 2004, pp. 1-10, XP002378284, Seoul, Korea, http://www.3gpp.org/ftp/tsg_sa/TSG_sa/TSGS_24/Docs/PDF/SP-040299.pdf.

* cited by examiner

*Primary Examiner* — Jinsong Hu
*Assistant Examiner* — Michael Nguyen
(74) *Attorney, Agent, or Firm* — Roylance, Abrams, Berdo and Goodman, LLP

(57) ABSTRACT

A method and apparatus is provided for signaling network sharing information about neighbor cells in an NS system where a RAN is shared among a plurality of CN operators. In the signaling method, it is determined whether each of neighbor cells of a current cell in which a UE is located, is shared by a CN operator other than a CN operator controlling the neighbor cell. System information without network sharing information is generated if at least one of the neighbor cells is shared by a CN operator other than a CN operator controlling the neighbor cell. System information including the network sharing information is generated if none of the neighbor cells are shared by any CN operator other than CN operators controlling the neighbor cells. The system information is then broadcast to the UE from the current cell.

10 Claims, 10 Drawing Sheets

METHOD AND APPARATUS FOR TRANSMITTING/RECEIVING NETWORK SHARING INFORMATION ABOUT NEIGHBOR CELLS IN A NETWORK SHARING SYSTEM

CROSS-REFERENCE TO RELATED APPLICATIONS

This application claims the benefit under 35 U.S.C. §119 (a) of Korean Patent Application No. 10-2005-0007785 entitled "Method and Apparatus for Transmitting/Receiving Network Sharing Information about Neighbor Cells in a Network Sharing System" filed in the Korean Intellectual Property Office on Jan. 27, 2005, the entire disclosure of which is incorporated herein by reference.

BACKGROUND OF THE INVENTION

1. Field of the Invention

The present invention relates generally to a Network Sharing (NS) system. In particular, the present invention relates to a method of signaling network sharing information about neighbor cells to User Equipments (UEs), a UE operation in relation to the signaling, and an NS system therefor.

2. Description of the Related Art

A mobile communication system basically includes Radio Access Networks (RANs) and UEs. Each RAN, basically having a Node B, is connected to another network through a Core Network (CN). In doing so, RANs using different Radio Access Technologies (RATs) or operated by different operators, can access one or more CNs operated by the same or different CN operators. A technology of sharing a RAN among different CN operators is called network sharing (NS).

In a Code Division Multiple Access (CDMA) cellular mobile communication system compliant with the $3^{rd}$ Generation Partnership Project 2 (3GPP2) standards, a RAN includes a Base Transceiver Subsystem (BTS) and a Base Station Controller (BSC). The RAN is connected to a CN with a Mobile Switching Center (MSC). In Wideband CDMA (WCDMA) based on Global System for Mobile telecommunications (GSM) and General Packet Radio Service (GPRS) in compliance with the 3GPP standards, namely Universal Mobile Telecommunication System (UMTS), a RAN includes a cell and Node B, and a Radio Network Controller (RNC). The RAN is connected to a CN with a Serving GPRS Support Node (SGSN).

The CN operators are identified by their Public Land Mobile Network (PLMN) Identities (ids). Each PLMN id is made of a Mobile Country Code (MCC) and a Mobile Network Code (MNC). A UE selects the PLMN id of an intended CN operator autonomously or under the control of a network. To access the CN, the UE notifies its serving RAN of the selected PLMN id.

To move to a neighbor cell belonging to a more suitable CN operator, it needs to receive network sharing information indicating CN operators associated with neighbor cells.

Accordingly, a need exists for a system and method for efficiently signaling the network and sharing information of neighbor cells to a UE so that the UE can select the best CN operator during inter-cell roaming.

SUMMARY OF THE INVENTION

An object of embodiments of the present invention is to substantially solve at least the above problems and/or disadvantages, and to provide at least the advantages below.

Accordingly, embodiments of the present invention provide a method and apparatus for transmitting/receiving system information including network sharing information indicative of CN operators associated with neighbor cells in an NS system.

According to one aspect of embodiments of the present invention, a method of transmitting network sharing information about neighbor cells in an NS system where a RAN is shared among a plurality of CN operators is provided, wherein it is determined whether each of neighbor cells of a current cell in which a UE is located is shared by a CN operator other than a CN operator controlling the neighbor cell. System information without network sharing information is generated if at least one of the neighbor cells is shared by a CN operator other than a CN operator controlling the neighbor cell. System information including the network sharing information is generated if none of the neighbor cells are shared by any CN operator other than CN operators controlling the neighbor cells. The system information is then broadcast to the UE from the current cell.

According to another aspect of embodiments of the present invention, a method of receiving network sharing information about neighbor cells in an NS system where a RAN is shared among a plurality of CN operators is provided, wherein system information is received from a current cell in which a UE is located. It is determined whether the system information comprises network sharing information about neighbor cells of the current cell. If the system information comprises the network sharing information, cell reselection and CN operator reselection are performed according to the network sharing information. If the system information does not comprise the network sharing information, master system information indicating CN operators controlling the neighbor cells and CN operators sharing the neighbor cells is received from the neighbor cells and cell reselection and CN operator reselection are performed according to the master system information.

According to another aspect of embodiments of the present invention, a method of transmitting network sharing information about neighbor cells in an NS system where a RAN is shared among a plurality of CN operators is provided, wherein network sharing information about neighbor cells of a current cell in which a UE is located is generated. The network sharing information provides, for each neighbor cell, a CN operator ID identifying a CN operator controlling the neighbor cell, and a multiple ID list indicating the IDs of CN operators sharing each neighbor cell. System information comprising the network sharing information is then broadcast from the current cell.

According to still another aspect of embodiments of the present invention, a method of receiving network sharing information about neighbor cells in an NS system where a RAN is shared among a plurality of CN operators is provided, wherein system information is received from a current cell in which a UE is located. Network sharing information about neighbor cells of the current cell is acquired from the system information. The network sharing information provides, for each cell, a CN operator ID identifying a CN operator controlling each neighbor cell, and a multiple ID list indicating the IDs of CN operators sharing each neighbor cell. Cell reselection and CN operator reselection are performed according to the network sharing information.

According to yet another aspect of embodiments of the present invention, an NS system where a RAN is shared among a plurality of CN operators is provided, wherein a UE acquires a CN operator ID and a multiple ID list for each neighbor cell of a current cell. The CN operator ID identifies a CN operator controlling the neighbor cell, and the multiple ID list indicates CN operators sharing the neighbor cell. The UE performs cell reselection and CN operator reselection based on the CN operator IDs and the multiple ID lists. An RNC is provided and generates network sharing information providing the CN operator IDs and the multiple ID lists for the neighbor cells, and broadcasts the network sharing information to the UE through the current cell.

BRIEF DESCRIPTION OF THE DRAWINGS

The above and other objects, features and advantages of the present invention will become more apparent from the following detailed description when taken in conjunction with the accompanying drawings, in which.

Throughout the drawings, like reference numerals will be understood to refer to like parts, components and structures.

DETAILED DESCRIPTION OF EXEMPLARY EMBODIMENTS

Exemplary embodiments of the present invention will be described herein below with reference to the accompanying drawings. In the following description, well-known functions or constructions are not described in detail since they would obscure the invention in unnecessary detail.

Embodiments of the present invention are intended to provide a signaling system and method for broadcasting to UEs network sharing information indicating CN operators to which neighbor cells belong, i.e. neighbor cell PLMN information so that the UEs can select the best CN operators, and a UE operation in relation to the signaling in an NS system where a RAN is shared among different CN operators. The following description is made of an exemplary signaling procedure for transmitting neighbor cell PLMN information and a UE operation for effectively selecting a PLMN and reselecting to a cell to camp on by interpreting the neighbor cell PLMN information.

Figure 1:
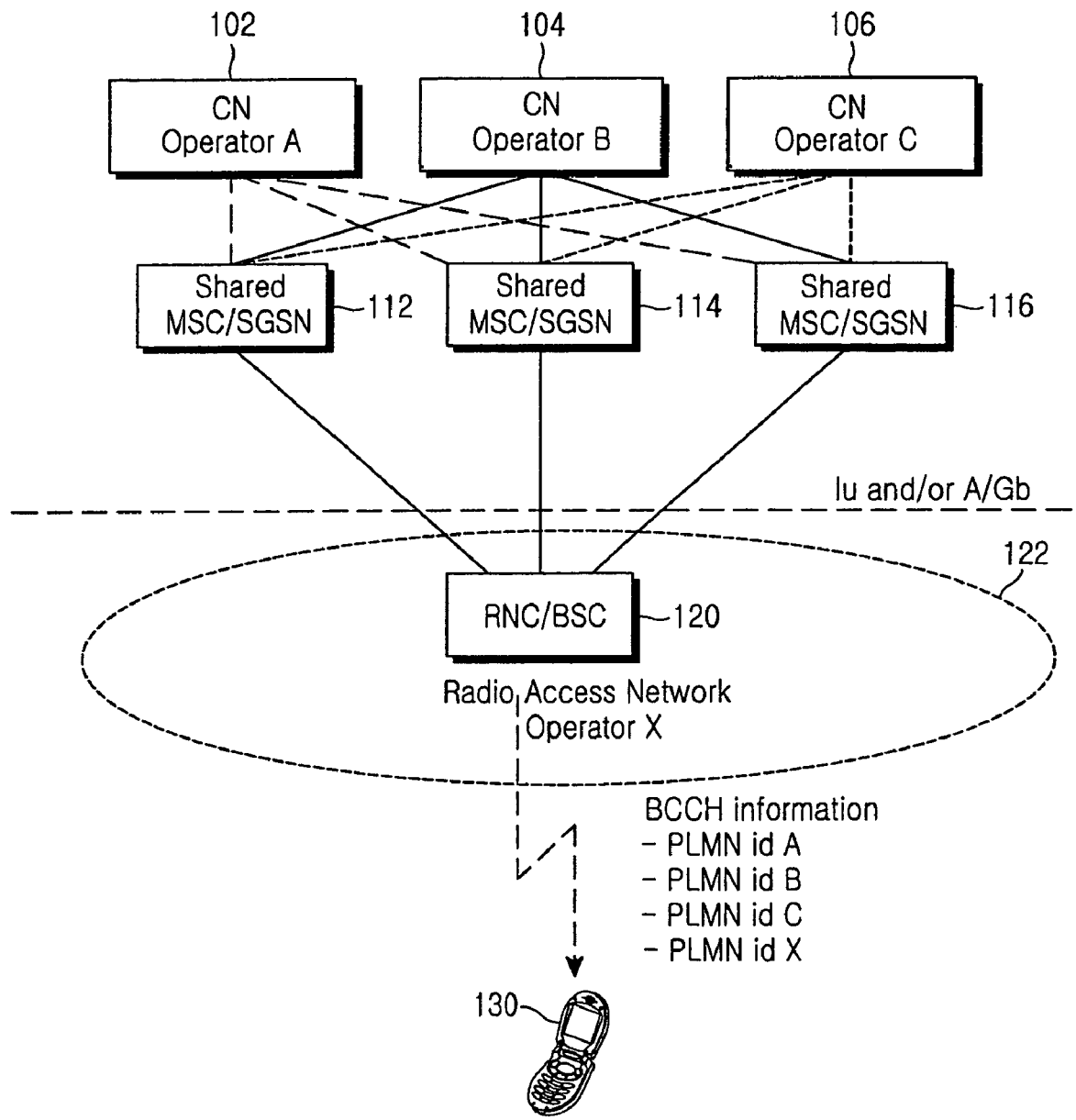
FIG. 1 illustrates a configuration of an NS system in which a RAN is shared among different CN operators.

FIG. 1 illustrates a configuration of an NS system in which a RAN is shared among different CN operators. While the illustrated network configuration is based on the 3G asynchronous mobile communication standards (3GPP), embodiments of the present invention are not limited to the specific network configuration but are applicable to any of technology fields sharing a RAN among different CN operators.

Referring to FIG. 1, a RAN 120, which provides service coverage to a cell 122, comprises an RNC/BSC. The RAN 120 is connected to CN nodes 112, 114 and 116 through an Iu interface and/or an A/Gb interface, wherein each CN node comprises an MSC/SGSN.

Different CN operators 102, 104 and 106 (CN operators A, B and C) share the MSCs/SGSNs 112, 114 and 116, respectively. The RAN 120, belonging to CN X, is shared among CN operators A, B and C. The shared RAN 120 transmits to a UE 130 a multiple PLMN list (i.e. shared PLMN list) indicating the PLMN ids of CN operators A, B and C, as well as the PLMN id of CN operator X, by broadcast system information on a Broadcast Control CHannel (BCCH) from the cell 122.

The UE 130 selects a suitable PLMN id based on the system information at an Access Stratum (AS) layer or a Non-Access Stratum (NAS) layer. The AS layer is responsible for a protocol associated with the Uu interface between the RNC and the UE, and the NAS layer overlies the AS layer, responsible for a protocol associated with the interface between the UE and the CN. The PLMN selection at the AS layer is called automatic PLMN selection, while PLMN selection at the NAS layer is called manual PLMN selection.

Figure 2:
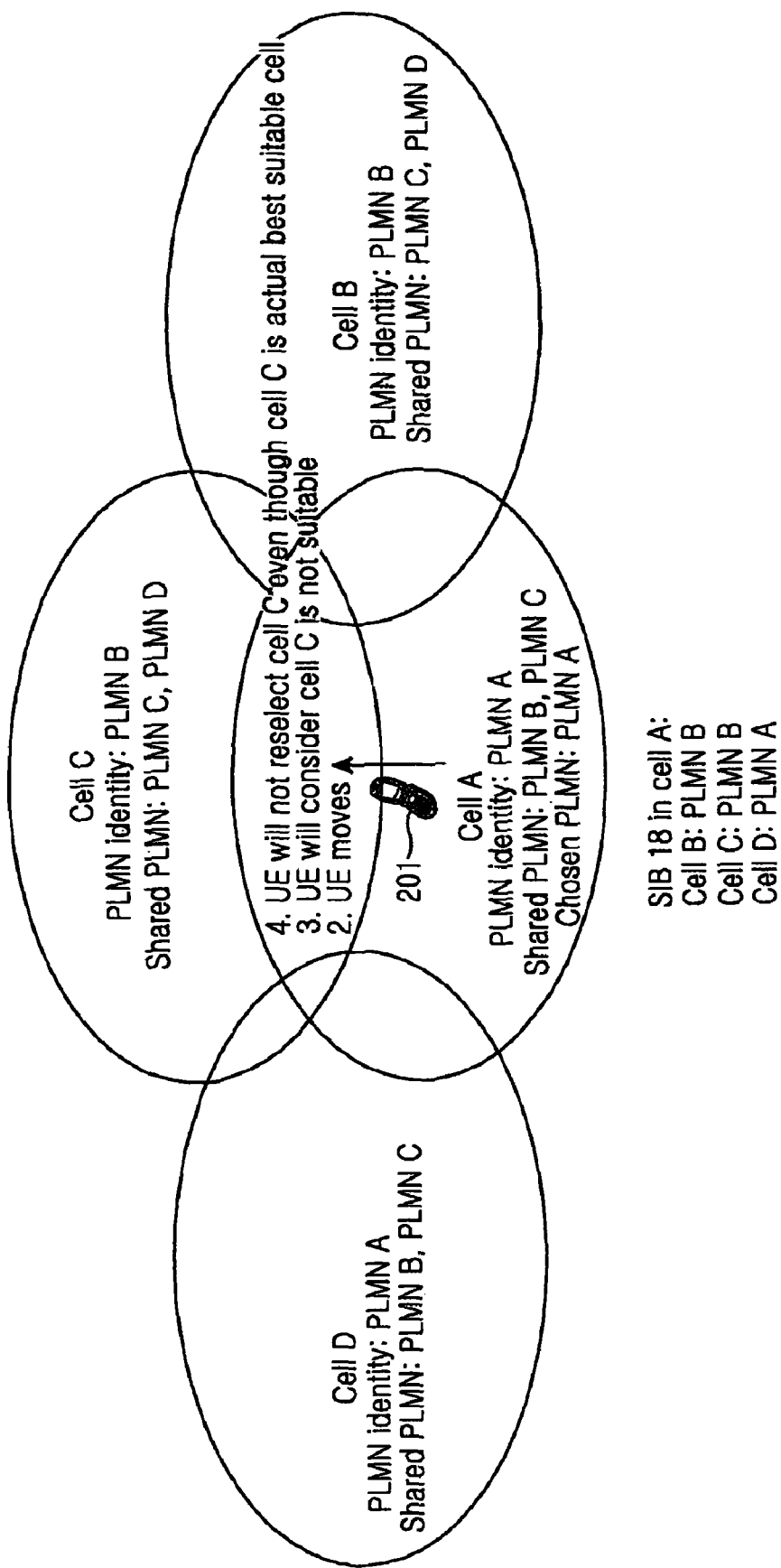
FIG. 2 illustrates inter-cell movement of a UE in an NS system using SIB 18 defined by 3GPP.
Figure 3:
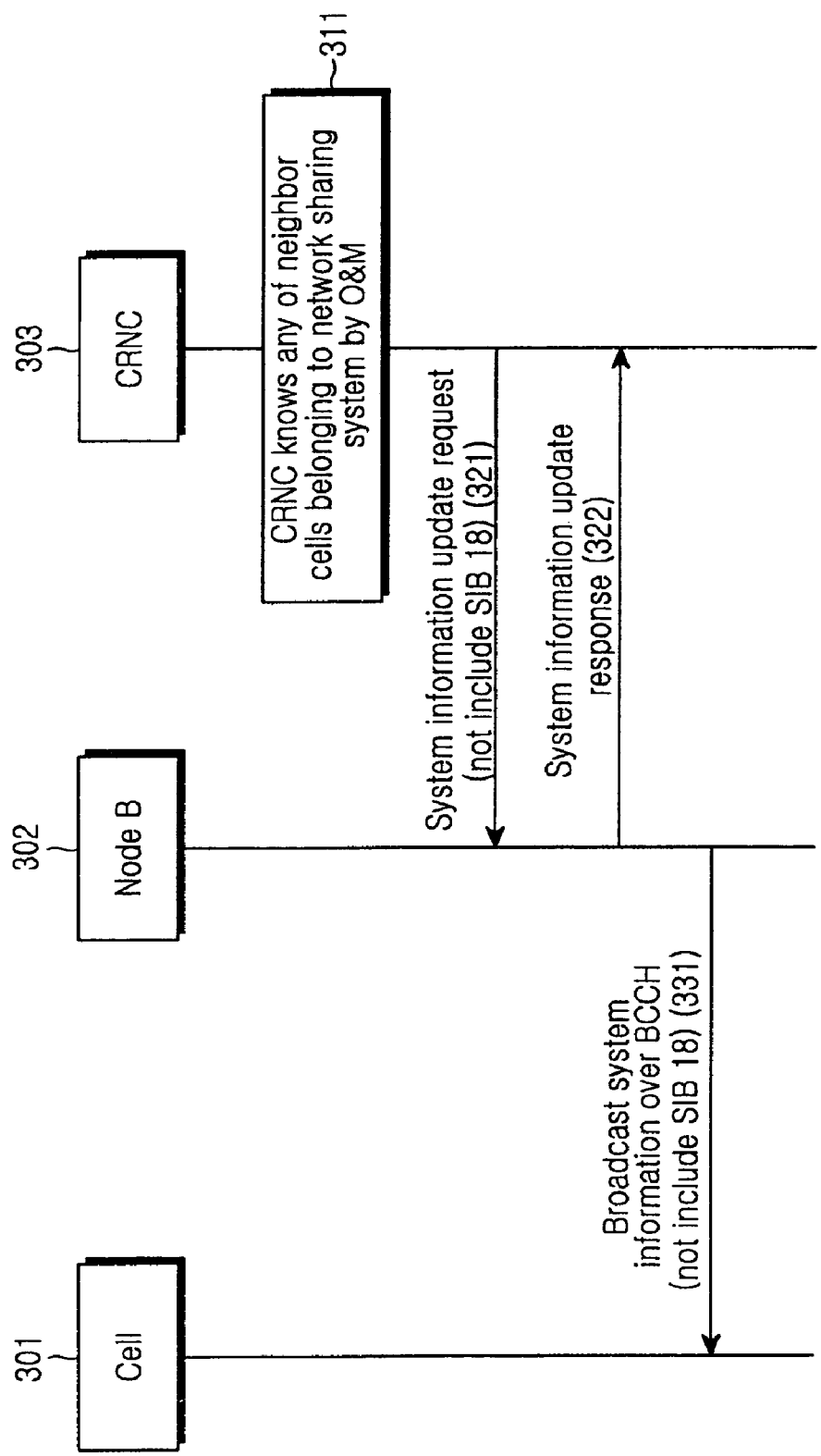
FIG. 3 is a diagram illustrating exemplary signaling flow for providing network sharing information about neighbor cells according to an embodiment of the present invention.

The 3GPP system broadcasts common information to UEs within the same cell on a common channel. The broadcast information is called system information. Information with the same property in the system information is constructed into a System Information Block (SIB). Cells within the coverage area of a RAN broadcast SIBs associated with an original CN authorized to control the RAN. The system information comprises neighbor cell PLMN information so that UEs can select the best CN operators. The neighbor cell PLMN information is delivered in SIB 18, for example, as shown in FIGS. 2 and 3.

Table 1 and Table 2 illustrate, by way of example, a structure of SIB 18 that carries neighbor cell PLMN information. Table 2 illustrates the Information Element (IE) of the neighbor cell PLMN information, "PLMN identities of neighbor cells". The UE can fast reselect to a cell of an available PLMN that can serve the UE according to the neighbor cell PLMN information of SIB 18.

TABLE 1

| Information Element/Group Name | Need | Multi | Type and Reference |
|---|---|---|---|
| Idle mode PLMN identities | OP | | PLMN identities of neighbor cells |
| Connected mode PLMN identities | OP | | PLMN identities of neighbor cells |

TABLE 2

| Information Element/Group Name | Need | Multi | Type and Reference | Semantics Description |
|---|---|---|---|---|
| PLMNs of intra-frequency cells list | OP | 1 to <maxCellMeas> | | |

TABLE 2-continued

| Information Element/Group Name | Need | Multi | Type and Reference | Semantics Description |
|---|---|---|---|---|
| >PLMN identity | MD | | PLMN identity | Default value is the previous "PLMN identity" in the list. The default value for the first PLMN in the list is the identity of the selected PLMN |
| PLMNs of inter-frequency cells list | OP | 1 to <maxCellMeas> | | |
| >PLMN identity | MD | | PLMN identity | Default value is the previous "PLMN identity" in the list. The default value for the first PLMN in the list is the identity of the selected PLMN |
| PLMNs of inter-RAT cells list | OP | 1 to <maxCellMeas> | | |
| >PLMN identity | MD | | PLMN identity | Default value is the previous "PLMN identity" in the list. The default value for the first PLMN in the list is the identity of the selected PLMN |

Referring to Table 1, SIB 18 comprises an "Idle mode PLMN identities" IE for idle-mode UEs and a "Connected mode PLMN identities" IE for connected-mode UEs. No signaling connection is established between a UE and an RNC in an idle mode, while a signaling connection is established between them in a connected mode. The OP term represents optional. If an IE is optional, it means that the IE may or may not be included depending on system configuration. The MD term represents mandatory. If an IE is mandatory, it is requisite and may have a default value.

The "PLMN identities of neighbor cells" providing neighbor cell PLMN information by SIB 18, is illustrated in Table 2. Referring to Table 2, "maxCellMeas" represents the maximum number of cells to be measured. It can be set to a value up to 32. Thus, the neighbor cell information comprises a PLMN list of up to 32 cells with the same frequency band (PLMNs of intra-frequency cells list), a PLMN list of up to 32 cells with different frequency bands (PLMNs of inter-frequency cells list), and a PLMN list of up to 32 cells with different RATs (PLMNs of inter-RAT cells list). In each list, the "PLMN identity" set to MD under NEED is mandatory and its default value is the previous PLMN id in the list. The first PLMN id set to a default value in each list is a PLMN id selected by the UE. However, if the selected PLMN id does not indicate a GSM-Mobile Application Protocol (MAP) type PLMN, this PLMN id must be explicitly set.

The SIB 18 illustrated in Table 1 and Table 2 provides only the ids of PLMNs controlling the RANs of neighbor cells.

FIG. 2 illustrates inter-cell movement of a UE in an NS system using SIB 18 defined by 3GPP. Referring to FIG. 2, a UE 201 is located in Cell A neighboring Cell B, Cell C and Cell D. Cell A is under the control of PLMN A, and Cell B and Cell C are under the control of PLMN B. In addition to PLMN A, Cell A is shared by PLMN B and PLMN C. This PLMN information of Cell A is specified as a PLMN id and a multiple PLMN list in a Master Information Block (MIB). The PLMN id is set to PLMN A and the multiple PLMN list provides the ids of PLMN B and PLMN C.

In this example, the UE 201 is able to receive a desired service through PLMN A and PLMN D only, and PLMN D is higher in priority than PLMN A. However, the UE 201 selects PLMN A in Cell A because PLMN D nether controls Cell A nor shares Cell A, and the UE A is supposed to select one of PLMN A, PLMN B and PLMN C in Cell A. Regarding neighbor cells of Cell A, Cell B is controlled by PLMN B and shared by PLMN C and PLMN D, Cell C is controlled by PLMN B and shared by PLMN C and PLMN D, and Cell D is controlled by PLMN A and shared by PLMN B and PLMN C. Since SIB 18 comprises only the ids of original PLMNs controlling neighbor cells, SIB 18 from Cell A contains PLMN B as PLMN id for Cell B, PLMN B as PLMN id for Cell C, and PLMN A as PLMN id for Cell D.

In FIG. 2, a Step 2 denotes a movement of the UE 201 from Cell A to Cell C. In cell reselection triggered by the UE movement, a SIB received in Cell A is used. As the UE 201 moves toward Cell C, Cell C becomes the strongest cell to the UE 201 at a certain time among accessible cells including the serving Cell A.

According to SIB 18 from Cell A, the UE 201 misunderstands that Cell C belongs to PLMN B only. Because calls other than emergency calls cannot be made over PLMN B, the UE 201 considers that Cell C is not suitable to camp on in a Step 3. Instead of reselecting to more suitable Cell C, the UE 201 still stays in Cell A of PLMN A within a radio range fulfilling a cell selection criterion or reselects to Cell D in a bad radio status relative to Cell C. That is, in a Step 3 the US 201 will not reselect cell C even though cell C is actually the best suitable cell.

Although the UE 201 can receive a desired service through PLMN D by reselection to Cell C shared by PLMN D, it cannot select the best suitable cell because it has no knowledge of PLMNs sharing Cell C. The resulting service quality degradation and poor power use in downlink/uplink transmission from the UE 201 can lead to intra-cell and inter-cell interference.

As described above, with neighbor cell PLMN information comprising only the ids of original PLMNs controlling neighbor cells, the UE 201 misses a chance to select a higher-priority PLMN. In this context, the present invention enables a UE to select a higher-priority PLMN during inter-cell movement in an NS system in the following exemplary embodiments.

Exemplary Embodiment 1

The above and other problems encountered in the situation illustrated in FIG. 2 arises from transmission of only the ids of original PLMNs to which the RANs of neighbor cells belong, to a UE. Hence, SIB 18 is not transmitted if any of the neighbor cells whose PLMN information is to be signaled is shared by at least one PLMN other than an original PLMN.

In the absence of SIB 18 broadcast from a serving cell, the UE is unable to gain knowledge of PLMN information about the neighbor cells. Thus, the UE acquires the PLMN information by MIBs received from the neighbor cells for cell reselection. Despite time delay involved in receiving the MIBs from all the neighbor cells, the same problem as encountered in FIG. 2 is avoided.

FIG. 3 is a diagram illustrating exemplary signaling flow for providing network sharing information about neighbor cells according to an embodiment of the present invention. Reference numeral 301 denotes a cell, reference numeral 302 denotes a Node B controlling the cell 301, and reference numeral 303 denotes the Controlling RNC of the Node B 302.

Referring to FIG. 3, the CRNC 303 checks by operation and maintenance (O & M), whether any of the neighbor cells of the cell 301 belongs to an NS system and thus, is shared by other PLMNs in step 311. Other PLMNs refer to at least one shared PLMN other than the original PLMN to which a neighbor cell belongs. If at least one of the neighbor cells is shared by other PLMNs, the CRNC 303 transmits to the Node B 302, system information without SIB 18 for providing neighbor cell PLMN information by a "SYSTEM INFORMATION UPDATE REQUEST" message in step 321. The Node B 302 is provided to broadcast system information on a BCCH in the cell 301. In step 322, the Node B 302 transmits a "SYSTEM INFORMATION UPDATE RESPONSE" message to the CRNC 303, notifying of successful reception of the "SYSTEM INFORMATION UPDATE REQUEST" message. The Node B 302 then broadcasts the system information, free of SIB 18, to the cell 301 by a "BROADCAST SYSTEM INFORMATION" message on the BCCH in step 331.

Detecting the absence of SIB 18 in the system information, a UE within the cell 301 receives MIBs from all neighbor cells and acquires PLMN information about the neighbor cells for PLMN reselection and cell reselection.

Figure 4:
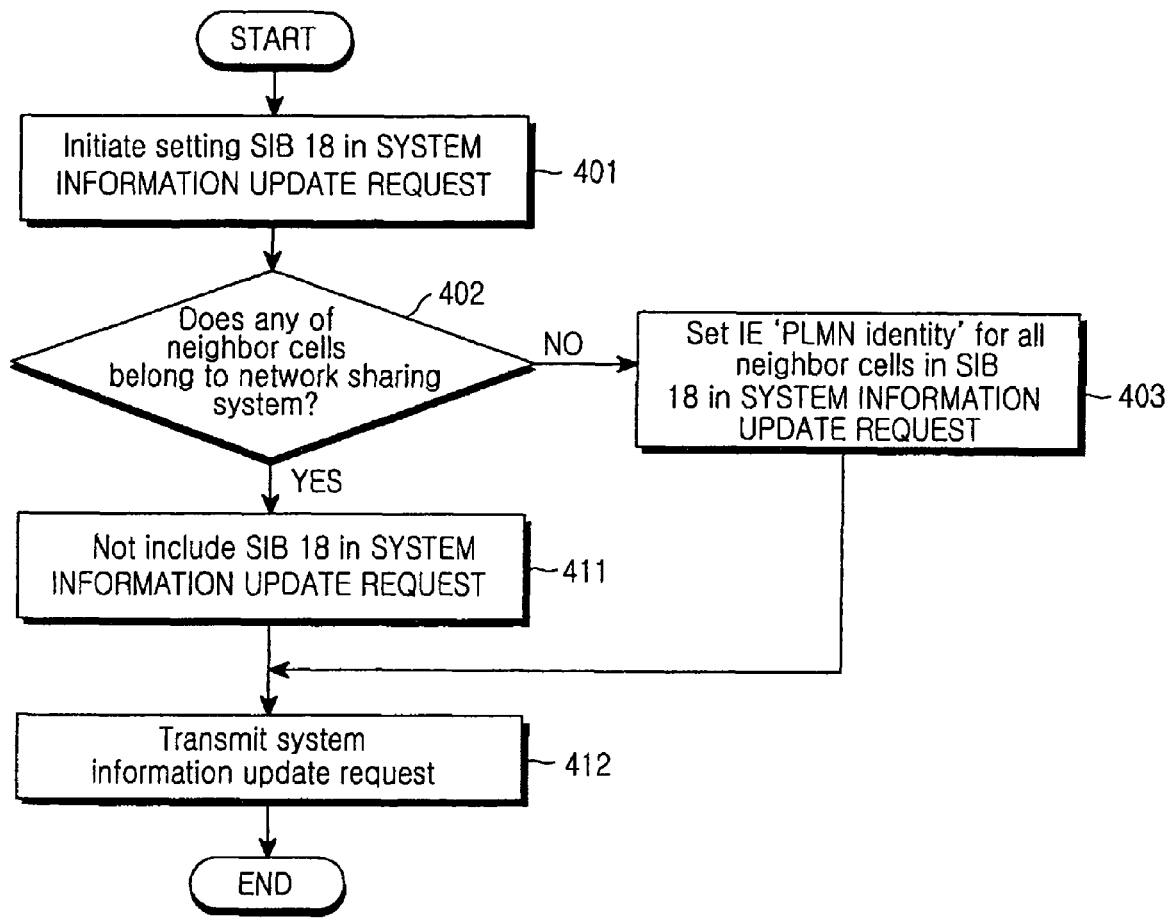
FIG. 4 is a flowchart illustrating an operation of a Controlling RNC (CRNC) according to an embodiment of the present invention.

FIG. 4 is a flowchart illustrating an operation of the CRNC according to an embodiment of the present invention.

Referring to FIG. 4, the CRNC initiates setting SIB 18 which will be included in the "SYSTEM INFORMATION UPDATE REQUEST" message for providing system information to be broadcast in a cell under the control of the CRNC (hereinafter, referred to as a current cell) in step 401. In step 402, the CRNC determines by O & M, whether any of the cells neighboring the current cell are shared by other PLMNs. If none of the neighbor cells are shared by other PLMNs, the CRNC sets PLMN information about all of the neighbor cells as neighbor cell PLMN information in SIB 18 in step 403. The neighbor cell PLMN information comprises only the ids of PLMNs to which the RNCs of the neighbor cells belong. If at least one of the neighbor cells is shared by other PLMNs in step 402, the CRNC excludes SIB 18 from the "SYSTEM INFORMATION UPDATE REQUEST" message in step 411, and transmits the "SYSTEM INFORMATION UPDATE REQUEST" message to the current cell in step 412. System information included in the "SYSTEM INFORMATION UPDATE REQUEST" message is broadcast from the current cell.

Figure 5:
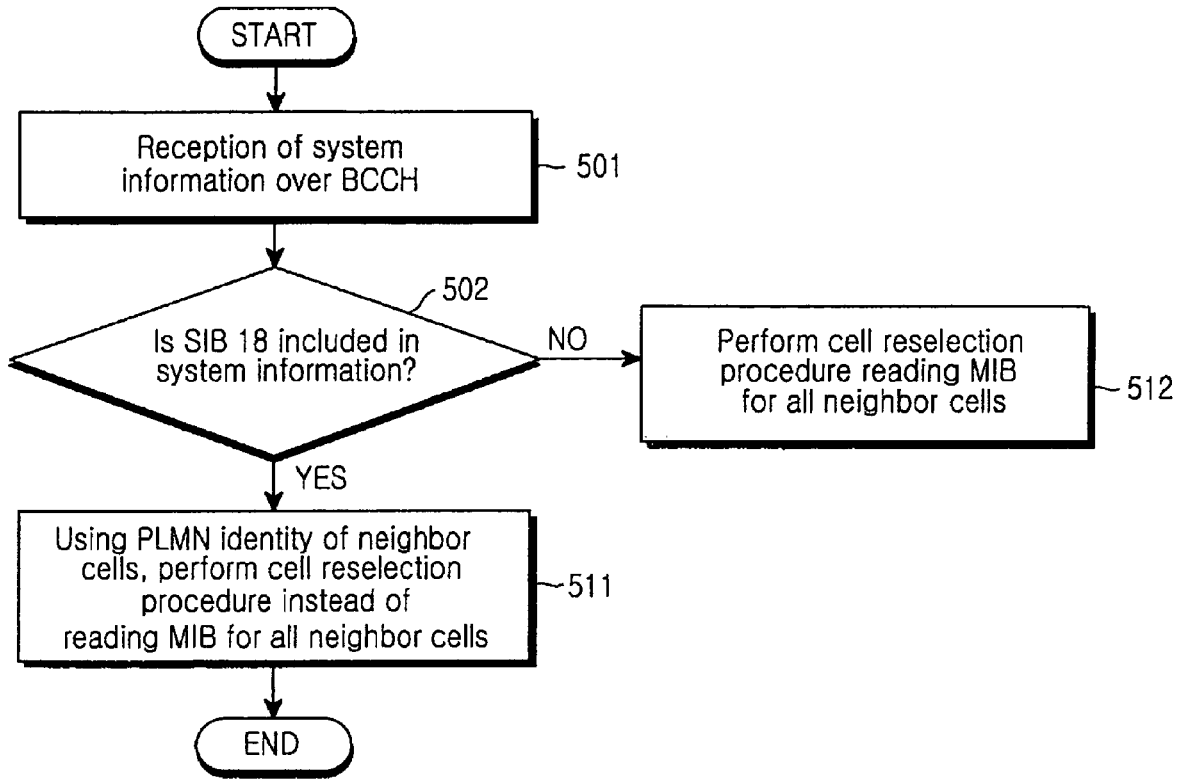
FIG. 5 is a flowchart illustrating an operation of a UE according to an embodiment of the present invention.

FIG. 5 is a flowchart illustrating a UE operation according to an embodiment of the present invention.

Referring to FIG. 5, the UE receives system information on the BCCH from the current cell in step 501, and determines the presence or absence of SIB 18 in the system information in step 502. In the presence of SIB 18, the UE performs PLMN reselection and cell reselection using PLMN ids associated with the neighbor cells in step 511. Because the UE acquires neighbor cell PLMN information from SIB 18, it does not need to receive MIBs from neighbor cells. The UE can receive a desired service and selects a neighbor cell belonging to the highest-priority PLMN based on the neighbor cell PLMN information of SIB 18.

In the absence of SIB 18 in step 502, the UE receives MIBs from all accessible neighbor cells, reads PLMN ids and multiple PLMN lists for the neighbor cells, and performs PLMN reselection and cell reselection based on the PLMN ids and multiple PLMN lists in step 512.

Exemplary Embodiment 2

The SIB 18 provides neighbor cell PLMN information with information about PLMNs sharing neighbor cells. Hence, the UE gets knowledge of all PLMNs sharing the neighbor cells by SIB 18. To inform of PLMNs sharing neighbor cells in an NS system, the multiple PLMN list (i.e. shared PLMN list) of each neighbor cell is carried in the existing SIB 18 or in a new SIB.

Figure 6:
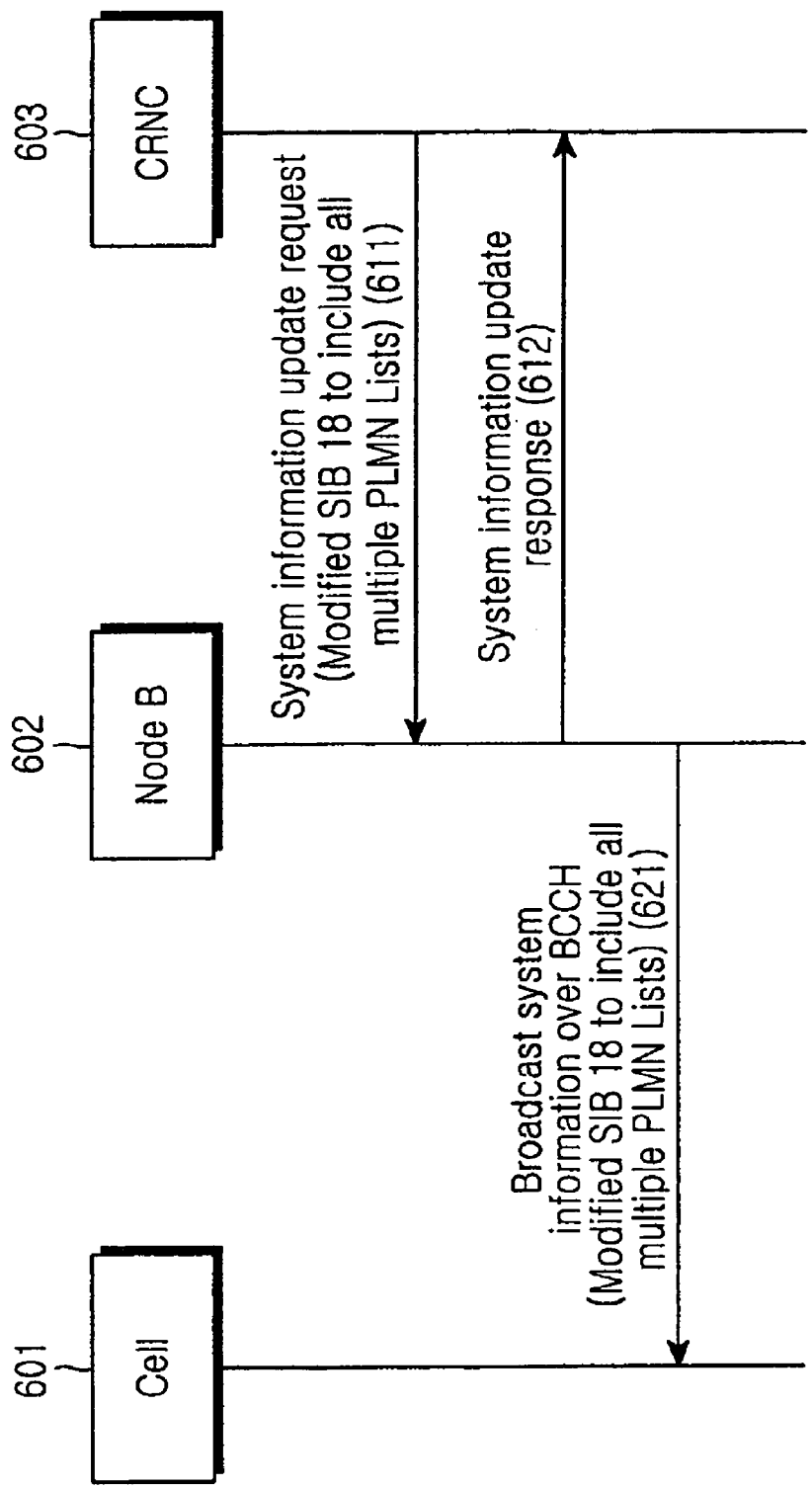
FIG. 6 is a diagram illustrating exemplary signaling flow for providing network sharing information about neighbor cells according to a second embodiment of the present invention.

FIG. 6 is a diagram illustrating exemplary signaling flow for providing network sharing information about neighbor cells according to another embodiment of the present invention. In the illustrated case of FIG. 6, a PLMN list indicating PLMNs sharing each neighbor cell is included in SIB 18. Reference numerals 601, 602 and 603 denote a cell, a Node B controlling the cell, and the CRNC of the Node B, respectively.

Referring to FIG. 6, the CRNC 603 sets a multiple PLMN list indicating PLMNs sharing each of cells neighboring the cell 601 in SIB 18 and transmits a "SYSTEM INFORMATION UPDATE REQUEST" message with SIB 18 to the Node B 602 in step 611. This modified SIB 18 comprises PLMN ids and multiple PLMN lists associated with the neighbor cells, each PLMN list indicating the ids of all PLMNs sharing a corresponding neighbor cell.

In step 612, the Node B 602 replies to the CRNC 603 with a "SYSTEM INFORMATION UPDATE RESPONSE" message. The Node B 602 broadcasts system information, particularly SIB 18 set in the "SYSTEM INFORMATION UPDATE REQUEST" message, to the cell 601 in step 621. As described above, SIB 18 comprises the PLMN ids and the multiple PLMN lists as neighbor cell PLMN information. From SIB 18, the UE determines the PLMNs sharing the neighbor cells as well as the PLMNs to which they belong, and thus performs accurate PLM reselection and cell reselection based on the PLMN information.

Table 3 below illustrates, by way of example, neighbor cell PLMN information according to the second embodiment of the present invention. The "PLMN identity" and "Multiple PLMN List" provide PLMNs sharing neighbor cells to the UE.

TABLE 3

| Information Element/Group Name | Need | Multi | Type and Reference |
|---|---|---|---|
| PLMNs of intra-frequency cells list | OP | 1 to <maxCellMeas> | |
| >PLMN identity | MD | | PLMN identity |
| >Multiple PLMN List | OP | 1 to 5 | |
| PLMNs of inter-frequency cells list | OP | 1 to <maxCellMeas> | |
| >PLMN identity | MD | | PLMN identity |
| >Multiple PLMN List | OP | 1 to 5 | |
| PLMNs of inter-RAT cells list | OP | 1 to <maxCellMeas> | |
| >PLMN identity | MD | | PLMN identity |
| >Multiple PLMN List | OP | 1 to 5 | |

Figure 7:
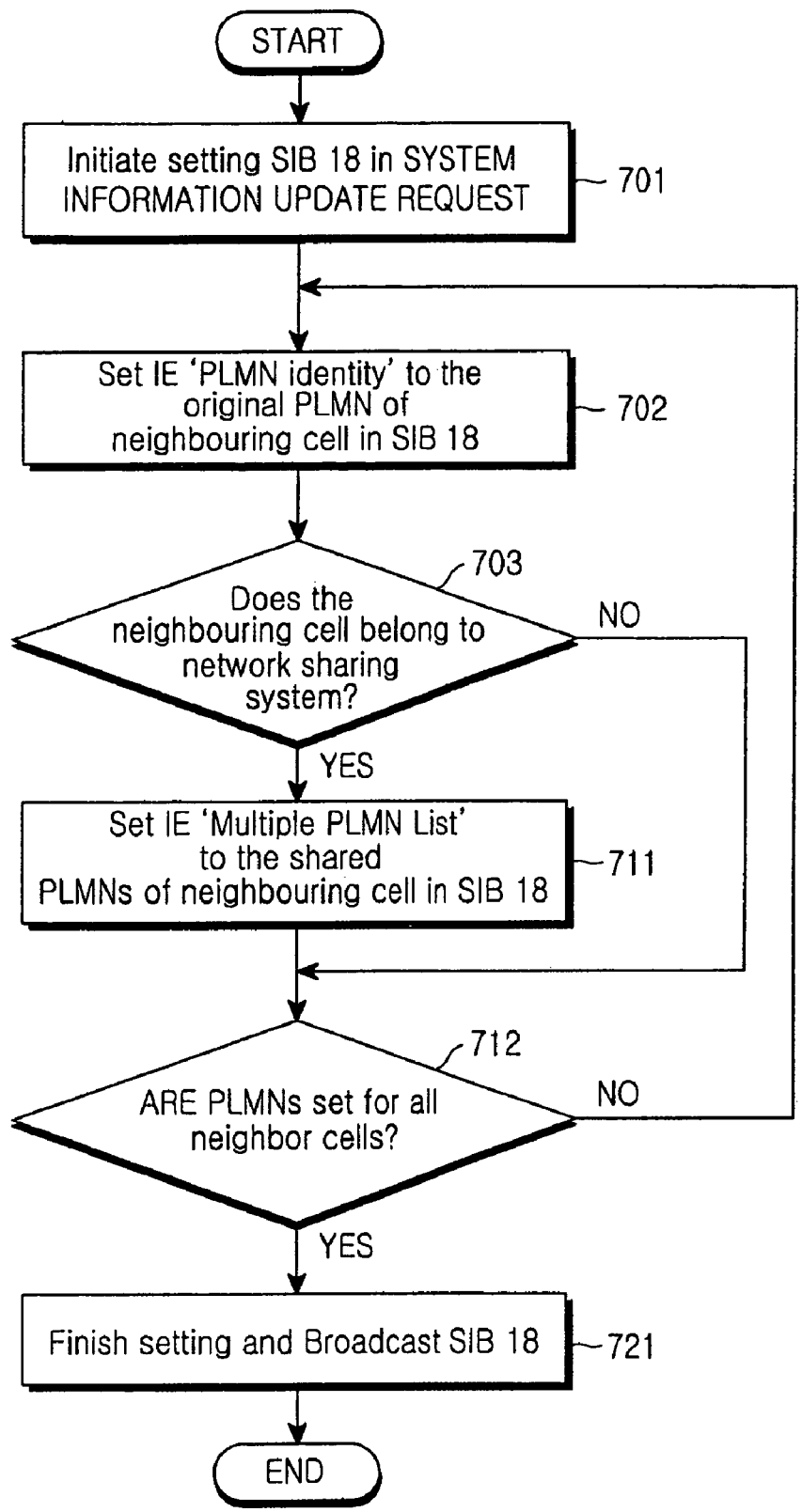
FIG. 7 is a flowchart illustrating an operation of the CRNC according to the second embodiment of the present invention.

FIG. 7 is a flowchart illustrating an operation of the CRNC according to the second embodiment of the present invention.

Referring to FIG. 7, the CRNC initiates setting of SIB 18 which will be included in the "SYSTEM INFORMATION UPDATE REQUEST" message for providing system information to be broadcast in a cell under the control of the CRNC (hereinafter, referred to as a current cell) in step 701. In step 702, the CRNC sets "PLMN identity" for a neighbor cell in SIB 18 to the original PLMN of a RAN controlling the neighbor cell. The CRNC determines whether the neighbor cell is shared by another PLMN in step 703. If the neighbor cell is shared by another PLMN, the CRNC sets the id of the shared PLMN in the "Multiple PLMN List" for the neighbor cell in step 711. If a plurality of shared PLMNs exist for the neighbor cell, the corresponding plurality of PLMN ids are set in the "Multiple PLMN List".

In step 712, the CRNC determines whether the "PLMN identity" and "Multiple PLMN List" as neighbor cell PLMN information have been set for all neighbor cells. Upon completion of setting the neighbor cell information, the CRNC completes setting of SIB 18 in step 721. The SIB 18 is then broadcast along with other SIBs in the current cell.

Figure 8:
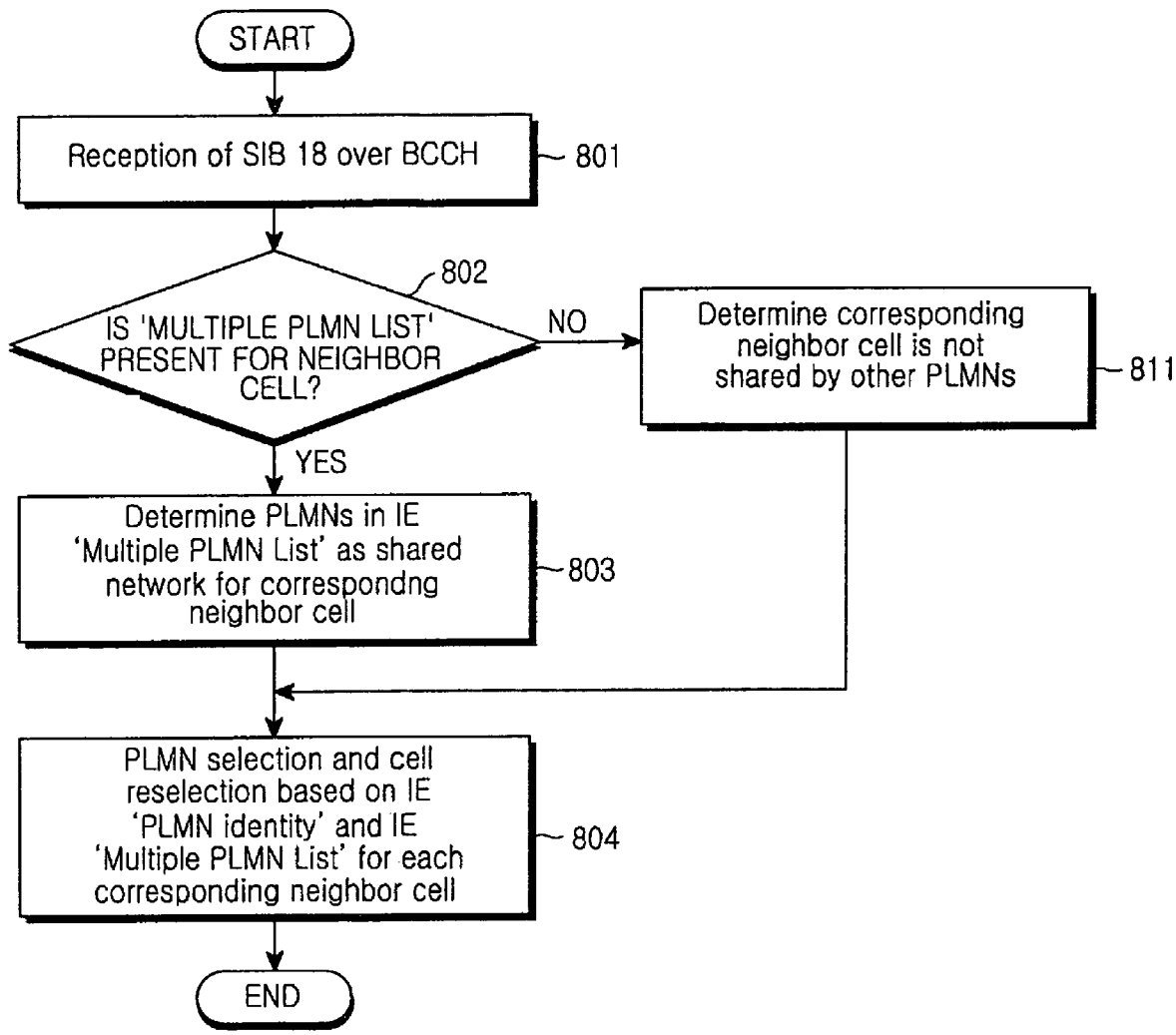
FIG. 8 is a flowchart illustrating an operation of the UE according to the second embodiment of the present invention.

FIG. 8 is a flowchart illustrating a UE operation according to the second embodiment of the present invention.

Referring to FIG. 8, the UE receives system information including SIB 18 that provides neighbor cell PLMN information, on the BCCH from the current cell in step 801, and determines the presence or absence of the "Multiple PLMN List" for a neighbor cell in SIB 18 in step 802. If the "Multiple PLMN List" exists for the neighbor cell, the UE determines that the neighbor cell is shared by PLMNs listed in the "Multiple PLMN List" in step 803. However, if the "Multiple PLMN List" is absent for the neighbor cell, the UE determines that the neighbor cell is not shared by other PLMNs in step 811 and proceeds to step 804.

In step 804, the UE determines available PLMNs for the neighbor cells by PLMN ids set in the "PLMN identity" and "Multiple PLMN List" for the neighbor cells, and performs PLMN reselection and cell reselection based on the PLMN ids and multiple PLMN lists of the neighbor cells. To be more specific, the UE selects the highest-priority PLMN from among the PLMN ids identifying the original PLMNs and the PLMN ids set in the multiple PLMN lists. If a neighbor cell of the selected PLMN is not the strongest cell, the UE selects a suitable PLMN and a suitable cell according to a predetermined selection criterion.

Exemplary Embodiment 3

Signaling overhead is reduced by enhancing the above-described second embodiment. If a neighbor cell has the same PLMN configuration as that of the current cell, PLMN information about the neighbor cell is excluded from SIB 18. In FIG. 2, for example, Cell A and Cell D have the same PLMN configuration. The term "PLMN configuration" means the original PLMN controlling a corresponding cell (PLMN id) and shared PLMNs for the cell (multiple PLMN list). Hence, Cell A and Cell D are identical in "PLMN identity" set to PLMN A and shared PLMNs being PLMN B and PLMN C. In this case, PLMN information about Cell D (PLMN id and multiple PLMN list) is absent in neighbor cell PLMN information transmitted from Cell A. However, if the PLMN id and multiple PLMN list of a neighbor cell have a different PLMN configuration from that of the current cell, they are explicitly signaled.

Neighbor cells are compared with the current cell in terms of PLMN configuration in the following manner. If "PLMN identity" indicating the original PLMN of a RAN controlling a neighbor cell and "Multiple PLMN List" indicating PLMNs sharing the neighbor cell are identical to those of the current cell, it is said that the neighbor cell and the current cell have the same PLMN configuration. Even though the neighbor cell and the current cell differ in "PLMN identity" and "Multiple PLMN List", if they have the same union of the two IEs, they are said to have the same PLMN configuration. If PLMN information does not exist for a certain neighbor cell in SIB 18, the UE considers that the neighbor cell has the same PLMN configuration as the current cell.

By way of example, if a neighbor cell is the same as the current cell in terms of "PLMN identity" and "Multiple PLMN List", it is determined that they have the same PLMN configuration.

Table 4 below illustrates, by way of example, neighbor cell PLMN information carried in SIB 18 according to the third embodiment of the present invention.

TABLE 4

| Information Element/Group Name | Need | Multi | Type and Reference | Semantics Description |
|---|---|---|---|---|
| PLMNs of intra-frequency cells list | OP | 1 to <maxCellMeas> | | |
| >PLMN identity | MD | | PLMN identity | Default value is the PLMN configuration for the previous cell in the list. The default value for the first PLMN in the list is the PLMN configuration of the current cell. |

TABLE 4-continued

| Information Element/Group Name | Need | Multi | Type and Reference | Semantics Description |
|---|---|---|---|---|
| >Multiple PLMN List | OP | 1 to 5 | | |
| PLMNs of inter-frequency cells list | OP | 1 to <maxCellMeas> | | |
| >PLMN identity | MD | | PLMN identity | Default value is the PLMN configuration for the previous cell in the list. The default value for the first PLMN in the list is the PLMN configuration of the current cell. |
| >Multiple PLMN List | OP | 1 to 5 | | |
| PLMNs of inter-RAT cells list | OP | 1 to <maxCellMeas> | | |
| >PLMN identity | MD | | PLMN identity | Default value is the PLMN configuration for the previous cell in the list. The default value for the first PLMN in the list is the PLMN configuration of the current cell. |
| >Multiple PLMN List | OP | 1 to 5 | | |

When setting neighbor cell PLMN information in SIB 18, the CRNC ranks a neighbor cell having the same PLMN configuration as the current cell at the first position in a neighbor cell list where PLMN information about the neighbor cell is to be written. If more neighbor cells have the same PLMN configuration as the current cell, they are ranked sequentially at the second, third, fourth positions and so on. Default values are set in "PLMN identity" of these neighbor cells, thereby making their PLMN information virtually empty. Also, the "Multiple PLMN List" is not included for the neighbor cells in SIB 18. Neighbor cells ranked sequentially in the neighbor cell list are assigned cell indexes 1, 2, 3, 4, . . . and so forth in this order.

Neighbor cells having different PLMN configurations from that of the current cell follow those neighbor cells having the same configuration as the current cell in the list. For them, "PLMN identity" is explicitly set. If a neighbor cell having a different PLMN configuration from that of the current cell is shared by other PLMNs, their PLMN ids are explicitly written in the "Multiple PLMN List" for the neighbor cell.

The neighbor cells are placed in the same order in other SIBs carrying information about the neighbor cells other than the neighbor cell PLMN information, for example SIB 11/12 including information for received signal measurement of the neighbor cells. This is because neighbor cell lists created for the UE are mapped in SIB 11/12, as well as in SIB 18.

When it is determined that the PLMN information of the first neighbor cell listed in received neighbor cell PLMN information is empty, that is, that it is set to a default value, the UE determines that the neighbor cell is identical to the current cell in PLMN configuration. That is, the neighbor cell has the same "PLMN identity" and "Multiple PLMN List" as those of the current cell. If "PLMN identity" for the next neighbor cell is explicitly set, this neighbor cell differs from the current cell in PLMN configuration. Thus, the UE reads the "PLMN identity" and "Multiple PLMN List" for the neighbor cell. The "Multiple PLMN List" provides the PLMN ids of shared PLMNs for the neighbor cell. If the "PLMN identity" for neighbor cell/cells at positions other than the first position in SIB 18 is empty, this implies that the neighbor cell/cells have the same PLMN configuration as their previous cells.

To make minimal modification to the traditional SIB 18, the neighbor cell PLMN information of Table 4 may not include "Multiple PLMN List". Then, the multiple PLMN lists of the neighbor cells are separately transmitted to the UE.

Table 5 illustrates, by way of example, neighbor cell PLMN information without the "Multiple PLMN List" in the format of the traditional SIB 18 in the scheme where the multiple PLMN lists of neighbor cells are separately transmitted to the UE. An empty "PLMN identity" for the first-positioned neighbor cell in Table 5 has the same meaning as in Table 4.

TABLE 5

| Information Element/Group Name | Need | Multi | Type and Reference | Semantics Description |
|---|---|---|---|---|
| PLMNs of intra-frequency cells list | OP | 1 to <maxCellMeas> | | |

TABLE 5-continued

| Information Element/Group Name | Need | Multi | Type and Reference | Semantics Description |
|---|---|---|---|---|
| >PLMN identity | MD | | PLMN identity | Default value is the PLMN configuration for the previous cell in the list. The default value for the first PLMN in the list is the PLMN configuration of the current cell. |
| PLMNs of inter-frequency cells list | OP | 1 to <maxCellMeas> | | |
| >PLMN identity | MD | | PLMN identity | Default value is the PLMN configuration for the previous cell in the list. The default value for the first PLMN in the list is the PLMN configuration of the current cell. |
| PLMNs of inter-RAT cells list | OP | 1 to <maxCellMeas> | | |
| >PLMN identity | MD | | PLMN identity | Default value is the PLMN configuration for the previous cell in the list. The default value for the first PLMN in the list is the PLMN configuration of the current cell. |

Network sharing information about neighbor cells illustrated in Table 5 is so configured that neighbor cells having the same "PLMN identity" and "Multiple PLMN List" as those of the current cell are ranked sequentially from the first position in a neighbor cell list. Thus, the CRNC can notify the UE that the neighbor cells ranked sequentially from the first position to until a point before a neighbor cell with an explicitly set "PLMN identity", are the same as the current cell in PLMN configuration. In this way, the NS system is supported with a minimal modification to the traditional SIB 18 of 3GPP.

Figure 9:
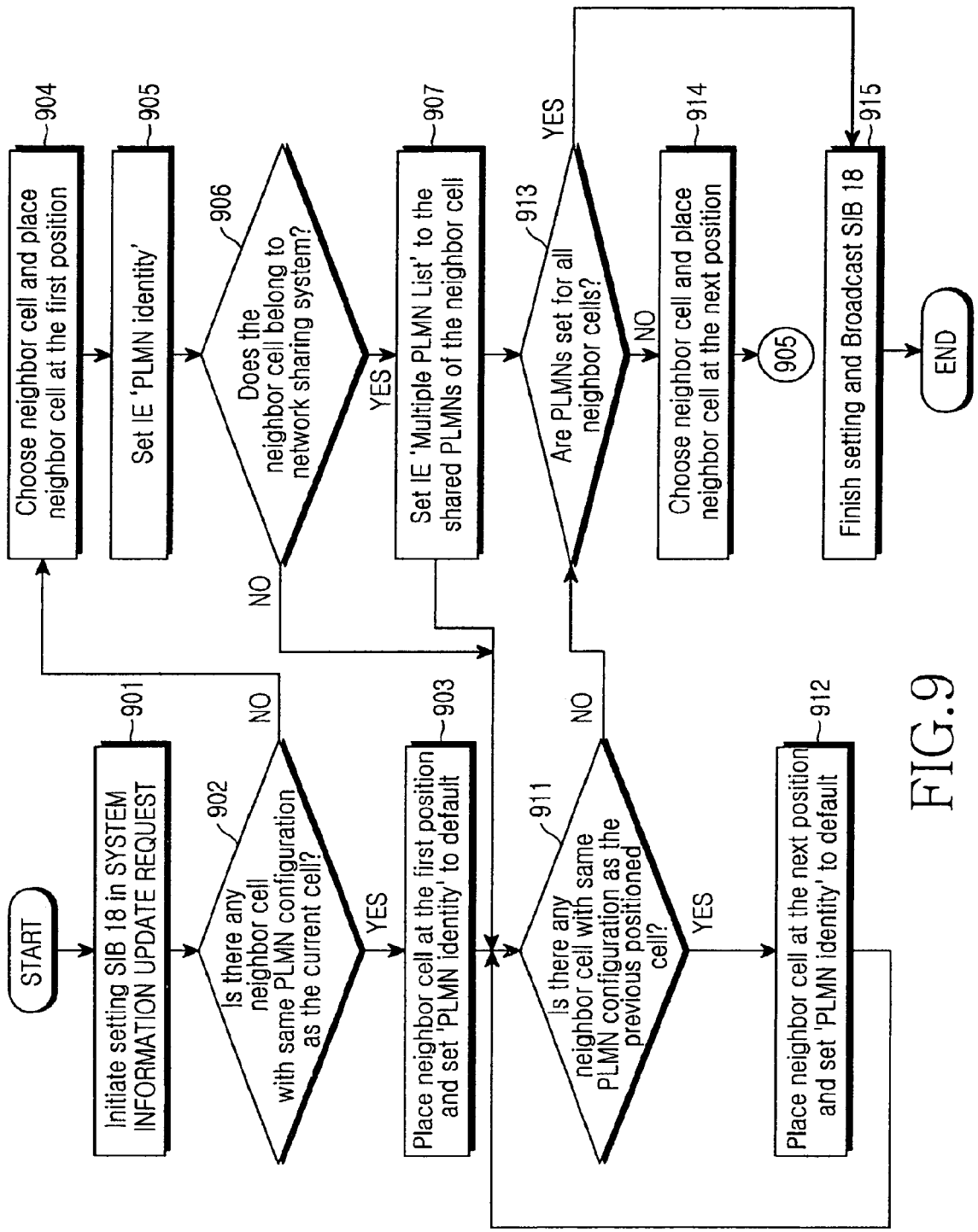
FIG. 9 is a flowchart illustrating an operation of the CRNC according to a third embodiment of the present invention.

FIG. 9 is a flowchart illustrating an operation of the CRNC according to a third embodiment of the present invention.

Referring to FIG. 9, the CRNC initiates setting of SIB 18 to be included in a "SYSTEM INFORMATION UPDATE REQUEST" message in step 901. This message provides a cell under the control of the CRNC (referred to as a current cell) with system information which will be broadcast from the current cell. In step 902, the CRNC determines whether any first neighbor cell exists in a neighbor cell list to be set in SIB 18. The first cell is defined as a neighbor cell having the same configuration ("PLMN identity" and "Multiple PLMN List") as the current cell. In the presence of such a first neighbor cell, the CRNC ranks the first neighbor cell at the first position in the neighbor cell list and sets "PLMN identity" for the first neighbor cell to a default value in SIB 18, thereby making "PLMN identity" virtually empty, in step 903.

In the absence of such a first neighbor cell, the CRNC ranks a second neighbor cell at the first position in the neighbor cell list in step 904, and sets "PLMN identity" for the second neighbor cell in step 905. The "PLMN identity" identifies the original PLMN of a RAN controlling the second neighbor cell. In step 906, the CRNC determines whether the second neighbor cell belongs to an NS system and thus, is shared by PLMNs other than the original PLMN. If the second neighbor cell belongs to the NS system, the CRNC sets the PLMN ids of the shared PLMNs in "Multiple PLMN List" for the second neighbor cell in step 907.

If the neighbor cell does not belong to the NS system in step 903 or 906, the CRNC determines whether a third neighbor cell having the same configuration as the previous positioned first or second neighbor cell exists among the remaining neighbor cells in step 911. In the presence of such a third cell, the CRNC ranks the third neighbor cell at the following position and makes "PLMN identity" empty for the third cell in step 912 and returns to step 911.

However, in the absence of such a third neighbor cell in step 911, the CRNC determines whether PLMN information has been completely set for all neighbor cells in step 913. If PLMN information is yet to be set, the CRNC selects one of the remaining neighbor cells and ranks it at the following position in the neighbor cell list in step 914 and returns to step 905. Upon completion of setting PLMN information for all neighbor cells, the CRNC completes setting of SIB 18 in step 915. The SIB 18 is then broadcast along with other SIBs in the current cell.

Figure 10:
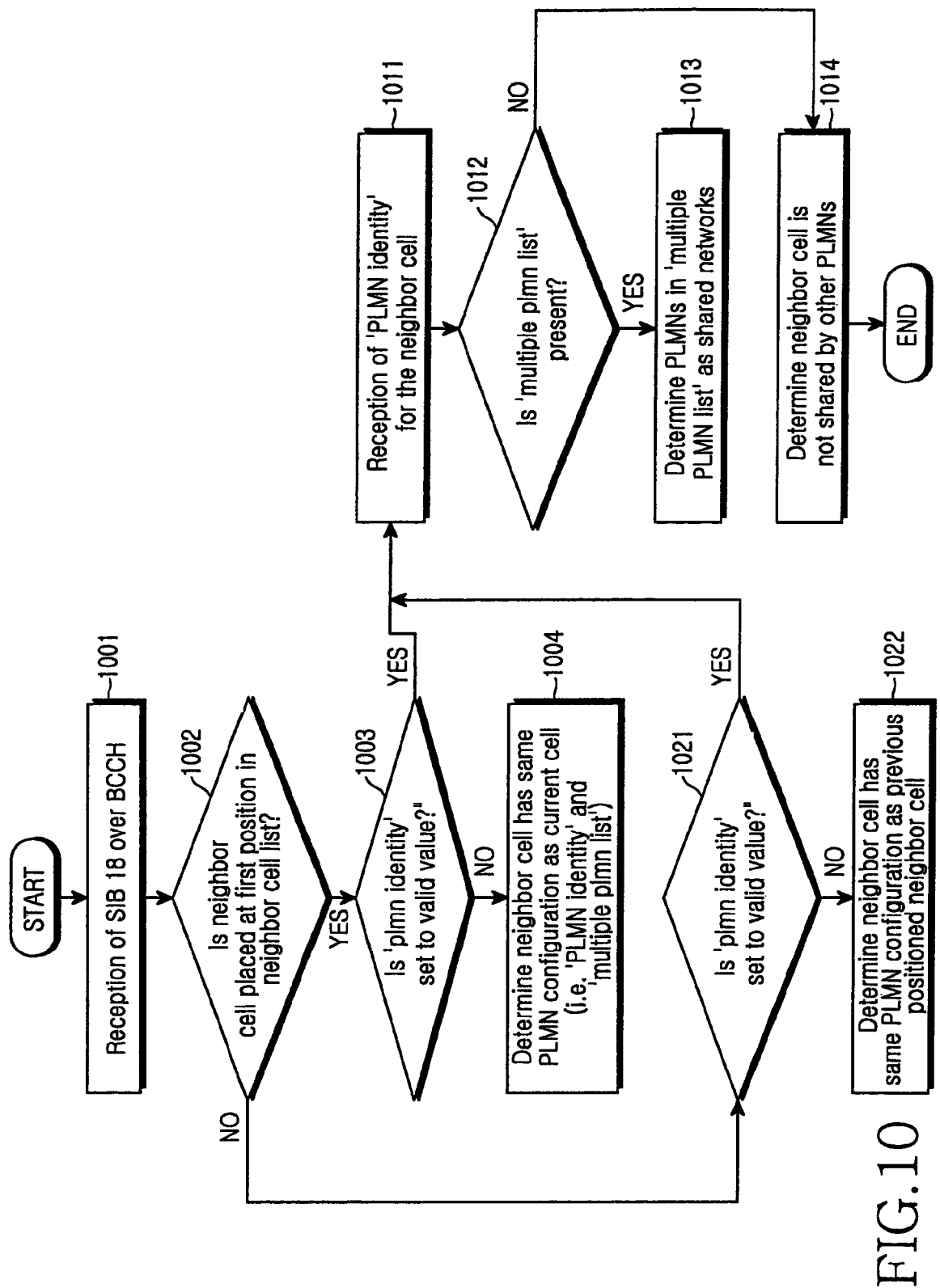
FIG. 10 is a flowchart illustrating an operation of the UE according to the third embodiment of the present invention.

FIG. 10 is a flowchart illustrating an operation of the UE according to the third embodiment of the present invention.

Referring to FIG. 10, the UE receives system information including SIB 18 on the BCCH in the current cell in step 1001. In step 1002, the UE acquires a neighbor cell list from SIB 18 and determines whether a neighbor cell of interest is ranked at the first position in the neighbor cell list. If the neighbor cell of interest is in the first position, the UE determines whether a valid value is set in "PLMN identity" for the neighbor cell in step 1003. The valid value is a value other than a default value indicating that "PLMN identity" is virtually empty. If "PLMN identity" is a default value, the UE determines that the first-positioned neighbor cell has the same PLMN configuration ("PLMN identity" and "Multiple PLMN List") as the current cell in step 1004.

However, if the "PLMN identity" is a valid value in step 1003, the UE reads "PLMN identity" for the neighbor cell in step 1011 and checks the presence or absence of the "Multiple PLMN List" for the neighbor cell in step 1012. In the presence of the "Multiple PLMN List", the UE determines that the neighbor cell is shared by PLMNs listed in "Multiple PLMN List" in step 1013. In the absence of the "Multiple PLMN List" in step 1012, the UE determines that the neighbor cell is not shared by other PLMNs in step 1014.

If the neighbor cell of interest is not the first-positioned in step 1002, the UE determines whether a valid value is set in the "PLMN identity" for the neighbor cell in step 1021. If the "PLMN identity" is a default value, the UE determines that the neighbor cell has the same PLMN configuration ("PLMN identity" and "Multiple PLMN List") as the previous-positioned cell in step 1022. If the "PLMN identity" is a valid value, the UE proceeds to step 1011.

As described above, embodiments of the present invention advantageously enable a UE to receive higher-quality communication services by selecting a suitable PLMN and cell since the current cell notifies the UE by system information of not only the original PLMNs, but shared PLMNs of neighbor cells of a current cell in which the UE is located in an NS system.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of receiving Public Land Mobile Network (PLMN) information about neighbor cells in a network sharing system, comprising:
   receiving a PLMN list included in system information broadcast from a current cell in which a user equipment (UE) is located, the PLMN list including at least one PLMN information about one or more neighbor cells;
   identifying a neighbor cell corresponding to the received PLMN information based on an order of the PLMN information in the PLMN list; and
   acquiring PLMN information of a specific neighbor cell based on the results of the identified, wherein, if the first position of the PLMN list is determined to be empty, then a neighbor cell corresponding to the first position in the PLMN list is determined to have the same PLMN configuration as the current cell, and
   wherein, if any position other than the first position of the PLMN list is determined to be empty, then a neighbor cell corresponding to the empty position in the PLMN list is determined to have the same PLMN configuration of a neighbor cell that corresponds to a position that is previous to the empty position in the PLMN list.

2. The method of claim 1, wherein the PLMN configuration comprises at least one PLMN identity and Multiple PLMN list.

3. An apparatus for receiving Public Land Mobile Network (PLMN) information about neighbor cells in a network sharing system, comprising:
   a receiver for receiving a PLMN list included in system information broadcast from a current cell in which a user equipment (UE) is located, the PLMN list including at least one PLMN information about one or more neighbor cells; and
   a controller for identifying a neighbor cell corresponding to the received PLMN information based on an order of the PLMN information in the PLMN list and acquiring PLMN information of a specific neighbor cell based on the results of the identified, wherein, if the first position of the PLMN list is determined to be empty, then a neighbor cell corresponding to the first position in the PLMN list is determined to have the same PLMN configuration as the current cell, and
   wherein, if any position other than the first position of the PLMN list is determined to be empty, then a neighbor cell corresponding to the empty position in the PLMN list is determined to have the same PLMN configuration of a neighbor cell that corresponds to a position that is previous to the empty position in the PLMN list.

4. The apparatus of claim 3, wherein the PLMN configuration comprises at least one PLMN identity and Multiple PLMN list.

5. A method of transmitting Public Land Mobile Network (PLMN) information about neighbor cells in a network sharing system, comprising:
   configuring a PLMN list including at least one PLMN information about one or more neighbor cells; and
   transmitting system information including the configured PLMN list, wherein, if a neighbor cell corresponding to the first position in the PLMN list has the same PLMN configuration as a current cell, then the first position of the PLMN list is configured to be empty, and
   wherein, if a neighbor cell corresponding to a specific position other than the first position in the PLMN list has the same PLMN configuration of a neighbor cell that corresponds to a position that is previous to the specific position in the PLMN list, the specific position of the PLMN list is configured to be empty.

6. The method of claim 5, wherein the PLMN configuration comprises at least one PLMN identity and Multiple PLMN list.

7. The apparatus of claim 5, wherein PLMN information in the PLMN list has the same order as a neighbor cell information corresponding to the PLMN information, the neighbor cell information being placed in the other neighbor cell list.

8. An apparatus of transmitting Public Land Mobile Network (PLMN) information about neighbor cells in a network sharing system, comprising:
   a controller for configuring a PLMN list including at least one PLMN information about one or more neighbor cells; and
   a transmitter for transmitting system information including the configured PLMN list,
   wherein, if a neighbor cell corresponding to the first position in the PLMN list has the same PLMN configuration as a current cell, then the first position of the PLMN list is configured to be empty, and
   wherein, if a neighbor cell corresponding to a specific position other than the first position in the PLMN list has the same PLMN configuration of a neighbor cell that corresponds to a position that is previous to the specific position in the PLMN list, the specific position of the PLMN list is configured to be empty.

9. The apparatus of claim 8, wherein the PLMN configuration comprises at least one PLMN identity and Multiple PLMN list.

10. The apparatus of claim 8, wherein PLMN information in the PLMN list has the same order as a neighbor cell information corresponding to the PLMN information, the neighbor cell information being placed in the other neighbor cell list.

* * * * *